United States Patent [19]
Hartwig

[11] Patent Number: 4,781,391
[45] Date of Patent: Nov. 1, 1988

[54] HARP CARRIER

[76] Inventor: Rudolph R. Hartwig, 3455 Indiana Rd., Rotonda, Fla. 33947

[21] Appl. No.: 23,829

[22] Filed: Mar. 9, 1987

[51] Int. Cl.$^4$ .............................................. B62B 5/02
[52] U.S. Cl. ........................... 280/5.2; 280/47.13 R; 280/47.2; 280/47.28; 414/451; 414/490; 206/314
[58] Field of Search .................. 206/314; 280/79.1 R, 280/79.1 A, 5.2, 5.28, 47.12, 47.13 R, 47.16, 47.2, 224, 47.17, 47.18, 47.19, 47.28; D17/16, 99; 414/444, 450, 451, 452, 457, 490

[56] References Cited

U.S. PATENT DOCUMENTS

| | | | |
|---|---|---|---|
| 1,117,586 | 11/1914 | Miller | 280/47.12 |
| 1,959,810 | 5/1934 | Bodge | 280/47.12 |
| 2,438,596 | 3/1948 | Arave et al. | 280/5.2 |
| 2,510,676 | 6/1950 | Biek | 414/450 |
| 2,736,225 | 2/1956 | Marcus | 280/79.1 A |
| 2,786,692 | 3/1957 | Timpson | 280/47.2 |
| 2,794,564 | 6/1957 | Frieburger | 414/451 |
| 3,857,579 | 12/1974 | Hoodenpyle | 280/47.2 |
| 3,862,695 | 1/1975 | Elliott | 280/47.12 |
| 4,369,982 | 1/1983 | Hein et al. | 280/47.13 R |
| 4,685,859 | 8/1987 | Marshall, Jr. | 280/79.1 A |

FOREIGN PATENT DOCUMENTS 752398  7/1956  United Kingdom ............... 280/47.2

OTHER PUBLICATIONS

"The Park Harp Carrier-the Ultimate in Design", Park Place Productions, Inc., Portland, Oregon, p. 16, 1983.
"The Famous Plektron Harp Carrier is Back", Southwest Technical Supply, LaJolla, CA, p. 63, 1977.
"Harp Accessories from Mina-Helwig Co.", Mina--Helwig Co., LaJolla, CA., 1984.

Primary Examiner—David M. Mitchell
Assistant Examiner—Brian L. Johnson
Attorney, Agent, or Firm—Pettis & McDonald

[57] ABSTRACT

A carrier for transporting a harp whereby the harp may be rolled in a substantially upright position across a supporting surface and, alternatively, whereby a harp may be transported in a substantially flat, horizontal position. The harp carrier includes specific structure for releasably engaging and retaining the base of the harp as well as adjustable arms for engaging and retaining the top of the harp. Provision is also made for carrying accessories such as music and a bench upon which the harpist may sit.

25 Claims, 2 Drawing Sheets

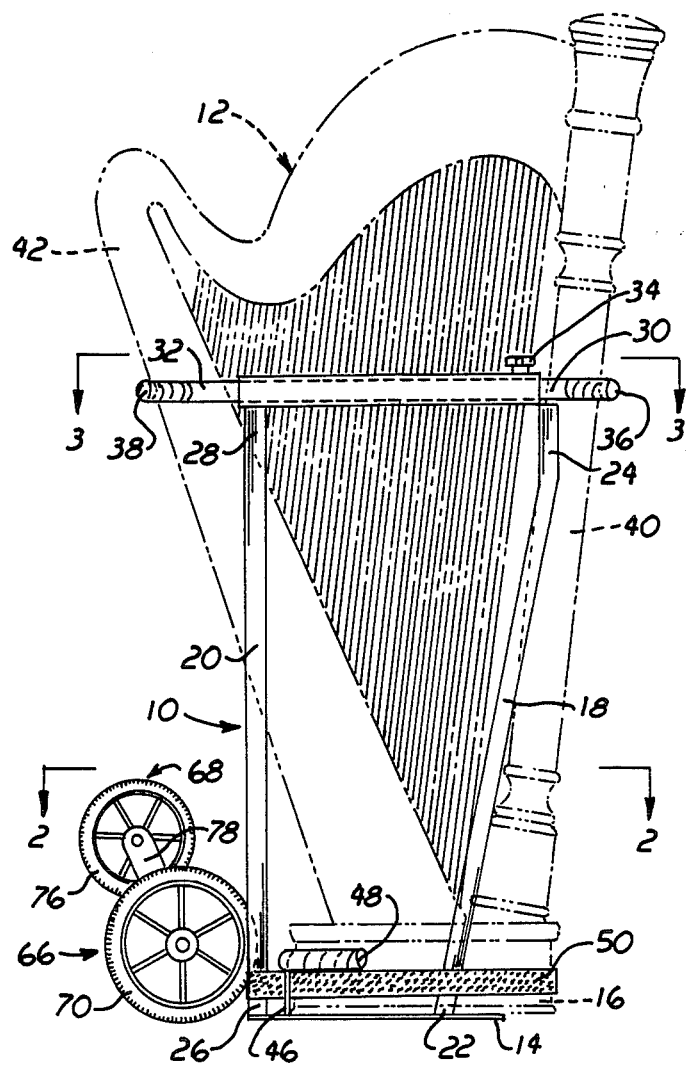
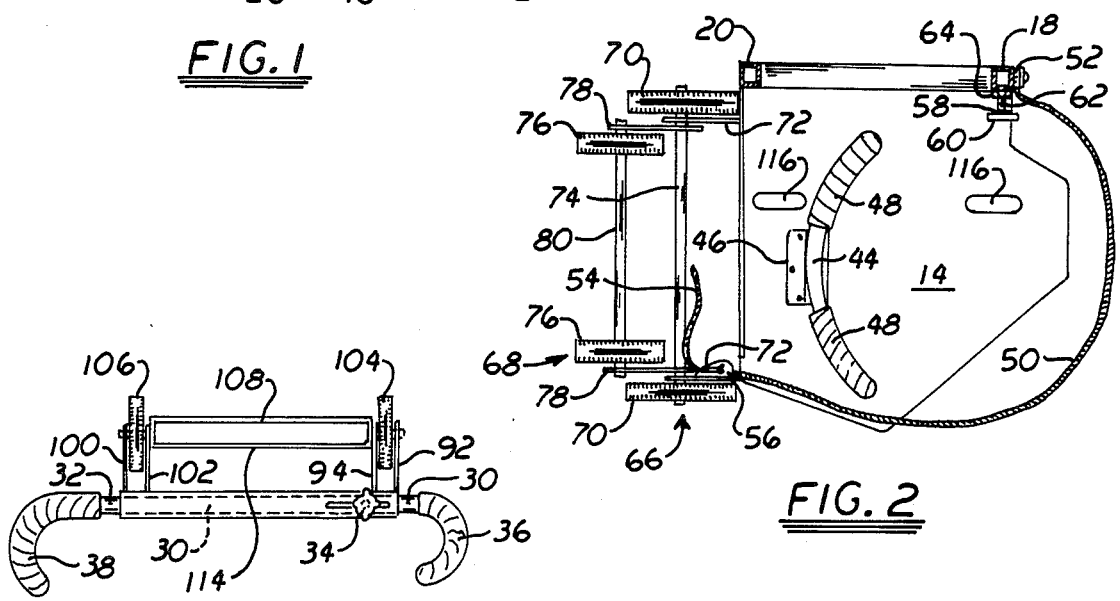
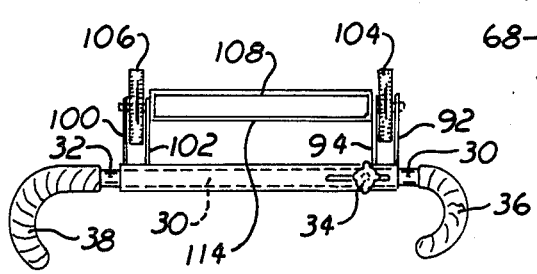
FIG. 1
FIG. 2
FIG. 3

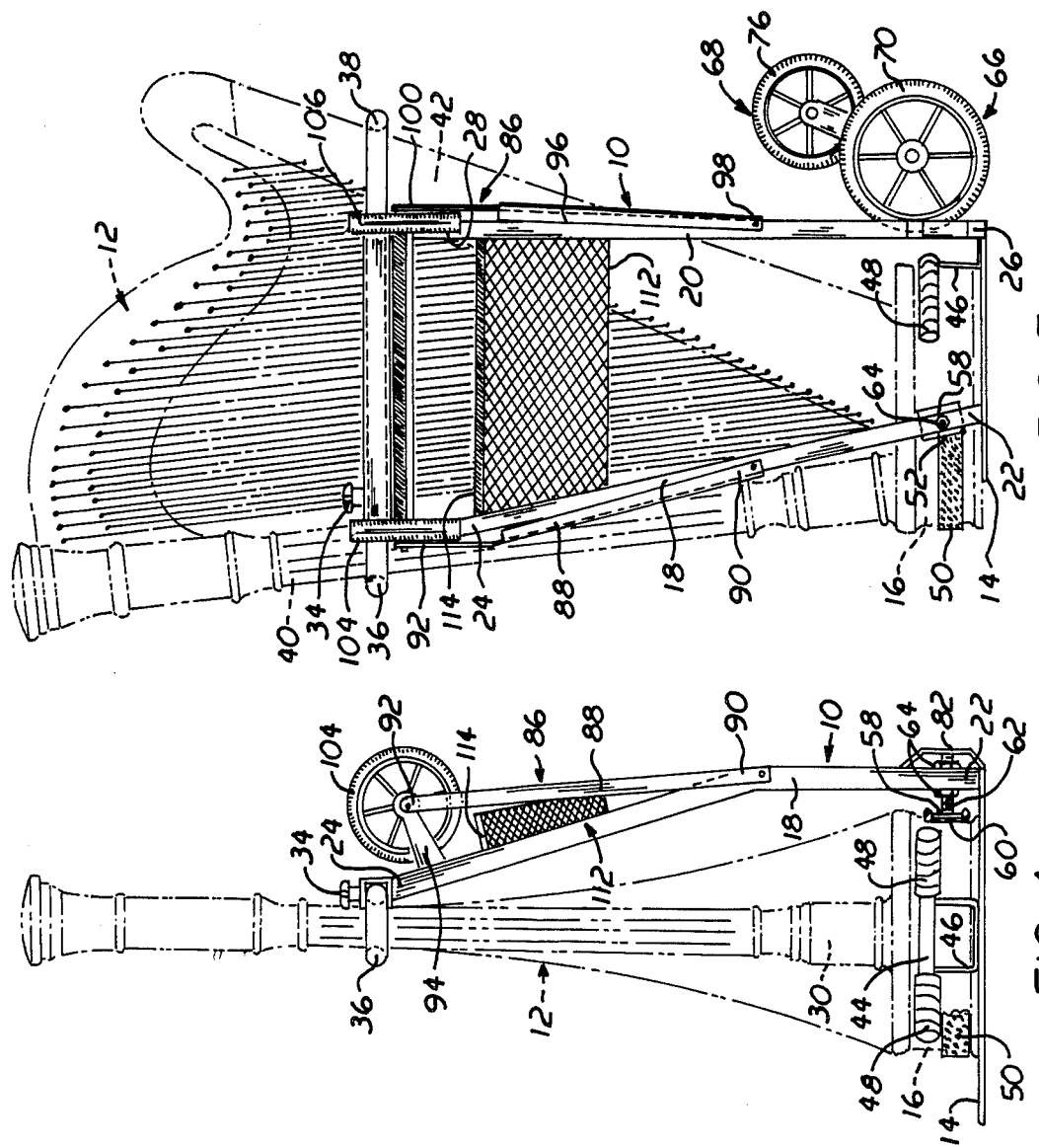

ically disclosed in U.S. Pat. No.
HARP CARRIER

BACKGROUND OF THE INVENTION

1. Field of the invention.

The present invention relates to a harp carrier whereby one person may easily and safely transport a harp from one location to another without having to lift the entire weight on the instrument. It is also to be understood that the term "harp" is used to designate a modern orchestra harp which is of substantially triangular shape, having a column of as much as almost six feet in length and usually having a curved top portion.

2. Description of the prior art.

It is certainly well known that concert harps are relatively large, heavy instruments. Also, they are quite delicate in that they include a large number of exposed strings so that the instrument can be played by plucking. Thus, transporting the harp from one location to another is not only difficult from a mechanical point of view, owing to the weight of the harp, but is also complicated by the delicate nature of the instrument. It is not surprising, then, that prior art devices are known for the purpose of storing and transporting such harps.

One such device is disclosed in U.S. Pat. No. 1,352,814 to Kirk. That patent teaches a substantially triangular trunk into which the harp is placed and secured for safe storage and transportation. However, upon studying the device of that patent, it is quite apparent that it would be quite difficult for one person to move or transport a harp contained in that trunk by himself.

U.S. Pat. No. 3,809,231 to Palma and Christiansen also discloses a harp trunk which may be opened in clam-shell fashion to receive a harp therein. The Palma harp trunk also teaches the use of a plurality of wheels at the base of that device, whereby the trunk may be rolled across a supporting surface to permit some transportion without having to lift the entire unit.

Though not the subject of any patent protection of which this inventor is aware, rolling harp carriers are currently available in the marketplace. One such carrier is known as the Plektron Harp Carrier and is available from Mina-Helwig Co. of Lajolla, Calif. Another rolling carrier is known as the Park Harp Carrier and is available from Park Place Productions, Inc. of Portland, Oreg.

Notwithstanding the existence of such prior art harp carriers, it remains clear that there is a need for a harp carrier which will permit a single person not only to move a harp across a supporting surface, but also to easily and safely load and unload the harp from a vehicle. Obviously, because of the value of the instrument being carried, any such carrier must insure that the harp is securely held thereon, while at the same time, hold the harp in such a fashion that no damage is done to its frame or strings.

SUMMARY OF THE INVENTION

The present invention relates to a carrier for transporting a harp whereby the harp is not only securely and safely restrained on the carrier, but also constructed so that one person may place the harp on the carrier, may then move the harp and carrier across a supporting surface, even up and down steps, and may also load the harp and carrier into a vehicle without assistance. Most simply stated, the harp carrier of this invention comprises a base plate onto which the base of the harp is placed, first and second side rails extending upwardly from the base, and a harp support arm extending transversely across the top ends of the side rails. Base restraining means comprises a cradle, a strap and a bumper are provided on or adjacent the base plate for receiving and restraining the harp base. The harp support arm includes opposed, curved distal ends, and one of those ends is adjustable, longitudinally and radially with respect to the other end. Accordingly, by adjusting and then locking the movable arm, the top of the harp is secured by the harp support arm.

Two pairs of wheels are provided substantially adjacent the base plate. The first wheel pair provides the primary means for transporting the harp carrier across a supporting surface. The second pair of wheels permits relative ease in moving the carrier up and down steps.

For the specific purpose of placing the harp carrier and a harp restrained thereon into a vehicle, such as, for example, a station wagon, a glide is formed on each of the side rails. Mounted substantially adjacent the top of each of the side rails is a pair of side wheels. As will be described in greater detail hereinafter, one person may easily load the harp carrier into the back of a station wagon simply by tipping the carrier onto the tailgate and lifting the base plate upwardly. Then, by virtue of the side wheels, the entire carrier may be rolled into place. The two glides permit final placement of the carrier in the vehicle in a convenient, efficient manner.

It is also to be noted that the harp carrier of this invention further comprises a basket mounted between the side rails whereby accessories such as, for example, music may be easily carried. The harp carrier further comprises a bench bar mounted between the side rails whereby the bench used by the harpist may also be transported with the harp. It is to be understood that the bench would be removed from the bench bar prior to placing the carrier inside a vehicle, as described above.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a left side elevation of the harp carrier of this invention with the harp shown in phantom.

FIG. 2 is a sectional plan view taken along line 2—2 of FIG. 1.

FIG. 3 is a plan view taken along line 3—3 of FIG. 1 illustrating details of the harp support arm and side wheel means.

FIG. 4 is a front side elevation of the harp carrier with the harp shown in phantom.

FIG. 5 is a right side elevation of the harp carrier with the harp shown in phantom.

FIG. 6 is a rear side elevation of the harp carrier with the harp shown in phantom.

Similar reference characters refer to similar parts throughout the several views of the drawings.

DETAILED DESCRIPTION

A preferred embodiment for the harp carrier of this invention is illustrated in the drawing figures. The harp carrier is generally indicated as 10 in the views of FIGS. 1, 4, 5 and 6, and a harp, generally indicated as 12, is shown in phantom in those same figures. Referring first to the view of FIG. 1, it can be seen that carrier 10 comprises a base plate 14 for receiving the base 16 of a harp 12 thereon. A first side rail 18 and a second side rail 20 extend upwardly from base plate 14. As most clearly seen in the views of FIGS. 1 and 5, first end 22 of side rail 18 is attached to base plate 14 and second end 24 of side rail 18 extends upwardly therefrom. In similar fashion, first end 26 of side rail 20 is attached to base plate 14, and second end 28 of side rail 20 extends upwardly therefrom.

A harp support arm means is mounted in interconnecting relation between second end 24 and second end 28. As perhaps best seen in the view of FIG. 3, the harp support arm means comprises a first arm 30 and a second arm 32. In this preferred embodiment, first arm 30 is dimensioned and configured to fit inside second arm 32 so that first arm 30 is longitudinally adjustable with respect to the second arm 32. In addition, arms 30 and 32 are preferably formed from a rounded material so that first arm 30 is also radially adjustable with respect to second arm 32. A locking means 34 is mounted on second arm 32 and is engageable with first arm 30 to fix the relative position of first arm 30 with respect to second arm 32. Still with regard to the view of FIG. 3, it can be seen that first arm 30 includes a curved distal end 36 which is preferably covered with a resilient material. In similar fashion, second arm 32 includes a curved distal end 38 which is also padded. Referring to the view of FIG. 1, it can be seen that end 36 is adjusted and locked into position by locking means 34 so that end 36 engages the column 40 of harp 12, while end 38 engages side 42 of harp 12. Accordingly, the harp support arm means positively retains the top of harp 12 without damaging its finish.

Referring next to the view of FIG. 2, it can be seen that carrier 10 further comprises base restraining means mounted on base plate 14 and on first side rail 18. The base restraining means comprises a harp base cradle 44 that is attached to base plate 14 as by cradle bracket 46. The ends of harp base cradle are curved and are covered with a resilient material 48 so as to prevent damage to the finish of harp base 16. The restraining means further comprises a strap 50 having a first strap end 52 attached to first end 22 of side rail 18 and a free strap end 54. As seen in the view of FIG. 2, free strap end 54 is passed through and engaged by buckle 56 so that strap 50 may be used to secure base 16 of harp 12 within harp base cradle 44.

As best seen in the views of FIGS. 2 and 4, the base restraining means further comprises an adjustable bumper 58 having a resilient head 60 and a threaded shaft 62. Bumper 58 is movably attached to first end 22 of side rail 18 by nuts 64. Nuts 64 are adjusted with respect to threaded shaft 62 in order to position resilient head 60 of bumper 58 adjacent base 16 of harp 12 as shown in the view of FIG. 4.

For the purpose of moving carrier 10 having harp 12 placed thereon across a supporting surface, carrier 10 further comprises first wheel means attached to base plate 14. Referring to the view of FIG. 2, it can be seen that the first wheel means comprises a first wheel pair generally indicated as 66 and a second wheel pair generally indicated as 68. First wheel pair 66 includes two first wheel 70 which are operatively attached to base plate 14 by corresponding first wheel brackets 72. A first axle rod 74 extends between the two first wheels 70. Referring to the view of FIG. 6, it can be seen that wheels 70 will engage the supporting surface when carrier 10 is tipped backwardly so as to permit the carrier 10 and a harp 12 secured thereon to roll across a supporting surface.

Second wheel pair 68 includes two second wheels 76 each one of which is operatively attached to first axle rod 74 by a corresponding second wheel bracket 78. A second axle rod 80 extends between the two second wheels 76. As is evident in the view of FIG. 1, the diameter of second wheels 76 is preferably somewhat less than the diameter of first wheels 70, and second wheel pair 68 is mounted above first wheel pair 66. Second wheel pair 68 facilitates movement of carrier 10 up and down obstacles such as, for example, steps or curbs.

Referring next to the views of FIGS. 4 and 6, it can be seen that a first glide 82 is formed on second side rail 18 substantially adjacent first end 22 thereof. In similar fashion, a second glide 84 is provided on second side rail 20 substantially adjacent first end 26 thereof. With regard to those same two drawing figures, it can be seen that harp carrier 10 further comprises side wheel means generally indicated as 86. Side wheel means 86 comprises a first side wheel support 88 having a first end 90 thereof attached to first side rail 18 and a second end 92 thereof in spaced apart relation to second end 24 of first side rail 18. A first side wheel support brace 94 is disposed in interconnecting relation between second end 92 and second end 24. In corresponding fashion, side wheel means 86 further comprises a second side wheel support 96 having a first end 98 attached to second side rail 20 and a second end 100 in spaced apart relation to second end 28 of side rail 20. A second side wheel support brace 102 is disposed in interconnecting relation between second end 100 and second end 28. A first side wheel 104 is operatively mounted between second end 92 and first support brace 94. A second side wheel 106 is similarly mounted between second end 100 and second support brace 102.

Referring to the view of FIG. 3, it can be seen that a bench bar 108 is disposed in interconnecting relation between first side wheel 104 and second side wheel 106. Bench bar 108 is preferably covered with a resilient material so that a harp bench 110 may be hung thereacross, as shown in phantom in the view of FIG. 6.

Harp carrier 10 further comprises basket means, generally indicated as 112, mounted in interconnecting relation between first side rail 18 and second side rail 20. Open top 114 of the basket means 112 is covered with a resilient material so as not to damage the finish of the legs of a harp bench 110 disposed across bench bar 108. It is to be understood that basket 112 may be used to carry, for example, music.

Finally, it should be noted that at least one hand slot 116 is formed through base plate 14. In the view of FIG. 2, two such hand slots 116 are illustrated as being preferred.

Having thus set forth a preferred construction for the harp carrier 10 of this invention, it is to be remembered that this is but a preferred embodiment. Attention is now invited to a description of the use of harp carrier 10. In order to place a harp 12 within carrier 10, one first would loosen locking means 34 to release first arm 30 and rotate it so that curved end 36 was substantially parallel to the plane defined by first side rail 18 and second side rail 20. Then, simply by tipping harp 12 forwardly by pressing on side 42 thereof, one may slide base plate 14 under base 16 of harp 12. Insuring that base 16 sits snugly against the harp base cradle 44, one would next adjust bumper 60 to engage base 16 and would then pass strap 50 around base 16, securing free end 54 of strap 50 through buckle 56. Next, first arm 30 would be rotated and adjusted so that curved end 36 and curved end 38 snugly engages column 40 and side 42, respectively. Upon tightening locking means 34, harp 12 is now secured within carrier 10. In order to transport the harp carrier 10 across a supporting surface, one merely has to tip the carrier 10 slightly to roll on first wheels 70. If steps or curbs are encountered, second wheels 76 will assist in passing such an obstacle.

Presuming that the carrier 10 containing a harp 12 thereon is then to be loaded into the rear of a vehicle, one would simply position the carrier 10 so that side wheel means 86 were adjacent the opening to the vehicle. Then, carrier 10 would be tilted back until side wheels 104 and 106 engaged the vehicle support surface onto which the carrier 10 was to be loaded. Then, utilizing hand slots 116, carrier 10 would be lifted up and rolled along side wheels 104, 106. Final positioning of the carrier 10 would be accomplished utilizing hand slots 116 and first and second glides 82 and 84.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Not that the invention has been described,
What is claimed is:

1. A carrier for transporting a harp, said carrier comprising: a base plate for receiving the base of the harp thereon, first and second side rails extending from said base plate, a first end of each of said side rails being fixed to said base plate, and a second end of each of said side rails extending therefrom; a harp support arm mounted in interconnecting relation between said second ends, said harp support arm comprising a first arm extending outwardly from said second end of said first side rail and a second arm extending outwardly from said second end of said second side rail, said first arm being adjustable relative to said second arm to releasably engage the column of a harp placed on said carrier; base restraining means comprising a harp base cradle mounted on said base plate and a harp base restraining element attached to said first end of said first side rail and being releasably engageable with the base of a harp placed on said carrier to selectively restrain the base of the harp on said base plate; and first wheel means attached to said base plate whereby said carrier may be rolled across a support surface.

2. A harp carrier as in claim 1 further comprising basket means mounted in interconnecting relation between said first and second side rails intermediate said respective first and second ends, whereby accessories for a harp may be carried in said basket means.

3. A harp carrier as in claim 2 wherein said basket means defines an open top, said open top having a substantially resilient material placed therearound.

4. A harp carrier as in claim 1 wherein said base restraining means comprises a harp base cradle attached to said base plate in receiving relation to the base of the harp, and strap means comprising a strap having a first strap end attached to said first end of said first side rail and a free strap end whereby said strap may at least partially surround the base of the harp, said strap means further comprising a buckle attached to said base plate whereby said free strap end may be releasably secured by said buckle.

5. A harp carrier as in claim 1 wherein said base restraining means further comprises a bumper attached to said first end of said first side rail in engaging relation to the base of a harp placed on said carrier.

6. A harp carrier as in claim 5 wherein said bumper includes a substantially resilient material disposed thereon in engaging relation to the base of a harp placed on said carrier.

7. A harp carrier as in claim 1 wherein said first and second arms comprise curved distal ends.

8. A harp carrier as in claim 7 wherein said curved distal ends have a substantially resilient material placed therearound.

9. A harp carrier as in claim 1 wherein said first wheel means comprises a first wheel pair, each one of said first wheels being operatively attached to said base plate by a corresponding first wheel bracket, and a first axle rod extending between said two first wheels and first wheel brackets.

10. A harp carrier as in claim 9 wherein said first axle rod defines an angle of about 90 degrees with respect to the line defined between said first ends of said first and second side rails.

11. A harp carrier as in claim 10 wherein one of said first wheels is attached to said base plate substantially adjacent said second side rail.

12. A harp carrier as in claim 10 wherein said first wheel means further comprises a second wheel pair, each one of said second wheels being operatively attached to said first axle rod by a corresponding second wheel bracket and a second axle rod extending between said two second wheels and second wheel brackets.

13. A harp carrier as in claim 12 wherein the diameter of said first wheels is greater than the diameter of said second wheels.

14. A harp carrier as in claim 1 further comprising at least one hand slot formed through said base plate.

15. A harp carrier as in claim 1 further comprising a first glide formed on said first side rail and a second glide formed on said second side rail, whereby said glides will abut the supporting surface when said carrier is laid on the side defined by said first and second side rails.

16. A harp carrier as in claim 1 further comprising side wheel means attached to said first and second side rails, whereby said side wheel means will abut the supporting surface when said carrier is laid on the side defined by said first and second side rails.

17. A harp carrier as in claim 16 wherein said side wheel means comprises a first side wheel support having a first end thereof attached to said first side rail and a second end thereof being in spaced apart relation to said second end of said first side rail, a first side wheel support brace disposed in interconnecting relation between said second end of said first side wheel support and said second end of said first side rail, a corresponding second side wheel support and second side wheel support brace attached to said second side rail, and first and second side wheels operatively attached, respectively, to the intersection of said first side wheel support and brace and of said second side wheel support and brace.

18. A harp carrier as in claim 17 further comprising a bench bar disposed in interconnecting relation between said first side wheel and said second side wheel, whereby a harp bench may be carried on said bench bar.

19. A harp carrier as in claim 18 wherein said bench bar has a substantially resilient material placed therearound.

20. A harp carrier as in claim 5 wherein said bumper includes a head portion and means for selectively adjusting said head portion toward and away from said first end.

21. A harp carrier as in claim 7 wherein said harp support arm includes means for longitudinally adjusting said first and said second arms relative to one another.

22. A harp carrier as in claim 21 wherein said harp support arm includes means for radially adjusting said first and second arms relative to one another.

23. A harp carrier as in claim 22 wherein said harp support arm further comprises locking means mounted on said second arm and engageable with said first arm, whereby the longitudinal and radial relationships of said first arm to said second arm may be fixed.

24. A carrier for transporting a harp, said carrier comprising: a base plate for receiving the base of the harp thereon, first and second side rails extending from said base plate, a first end of each of said side rails being fixed to said base plate, and a second end of each of said side rails extending therefrom; a harp support arm mounted in interconnecting relation between said second ends, said harp support arm comprising a first arm extending outwardly from said second end of said first side rail and a second arm extending outwardly from said second end of said second side rail, said first arm being adjustable relative to said second arm to releasably engage the column of a harp placed on said carrier; base restraining means mounted on said base plate and said first end of said first side rail and being releasably engageable with the base of a harp placed on said carrier to selectively restrain the base of the harp on said base plate; and first wheel means attached to said base plate whereby said carrier may be rolled across a support surface, said first wheel means comprising a first wheel pair, each one of said first wheels being operatively attached to said base plate by a corresponding first wheel bracket, a first axial rod extending between said two first wheels and first wheel brackets, said first axial rod defining an angle of about 90 degrees with respect to a line defined between said first ends of said first and second side rails, said first wheel means further comprising a second wheel pair, each one of said second wheels being operatively attached to said first axial rod by a corresponding second wheel bracket, and a second axial rod extending between said two second wheels and second wheel brackets.

25. A carrier for transporting a harp, said carrier comprising: a base plate for receiving the base of the harp thereon, first and second side rails extending from said base plate, a first end of each of said side rails being fixed to said base plate, and a second end of each of said side rails extending therefrom; a harp support arm mounted in interconnecting relation between said second ends, said harp support arm comprising a first arm extending outwardly from said second end of said first side rail and a second arm extending outwardly from said second end of said second side rail, said first arm being adjustable relative to said second arm to releasably engage the column of a harp placed on said carrier; base restraining means mounted on said base plate and said first end of said first side rail and being releasably engageable with the base of a harp placed on said carrier to selectively restrain the base of the harp on said base plate; and first wheel means attached to said base plate whereby said carrier may be rolled across a support surface, and further comprising side wheel means attached to said first and second side rails, whereby said side wheel means will abut the supporting surface when said carrier is laid on the side defined by said first and second side rails, said side wheel means comprising a first side wheel support having a first end thereof attached to said first side rail and a second end thereof being in spaced apart relation to said second end of said first side rail, a first side wheel support brace disposed in interconnecting relation between said second end of said first side wheel support and said second end of said first side rail, a corresponding second side wheel support and second side wheel support brace attached to said second side rail, and first and second side wheels operatively attached, respectively, to the intersection of said first side wheel support and brace and of said second side wheel support and brace.

* * * * *